C. A. SCHLAFLY.
SAFETY FRICTION GEAR.
APPLICATION FILED JAN. 30, 1922.

1,427,025.

Patented Aug. 22, 1922.
2 SHEETS—SHEET 1.

Inventor
Charles A. Schlafly

By
Attorneys

C. A. SCHLAFLY.
SAFETY FRICTION GEAR.
APPLICATION FILED JAN. 30, 1922.
1,427,025.
Patented Aug. 22, 1922.
2 SHEETS—SHEET 2.
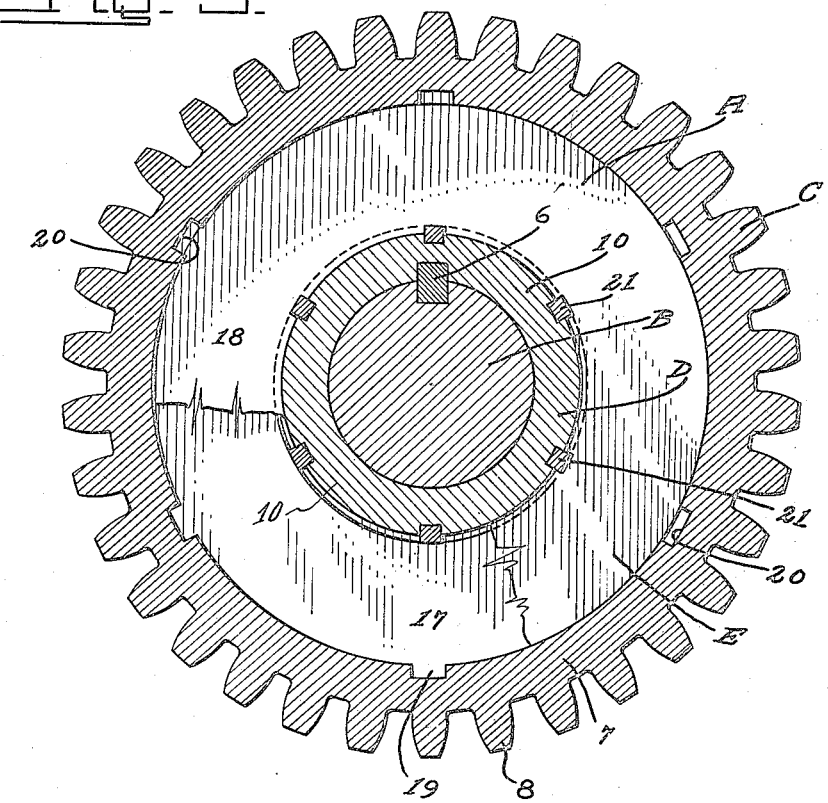
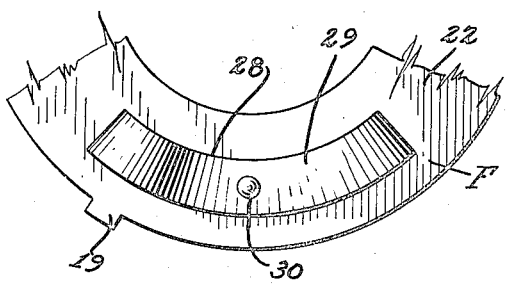
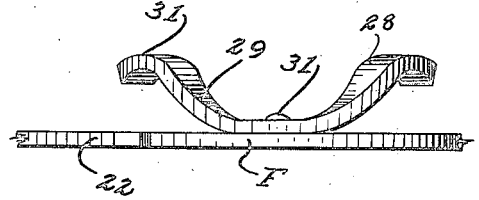
Inventor
Charles A. Schlafly

UNITED STATES PATENT OFFICE.

CHARLES A. SCHLAFLY, OF NEW PHILADELPHIA, OHIO.

SAFETY FRICTION GEAR.

1,427,025.   Specification of Letters Patent.   Patented Aug. 22, 1922.

Application filed January 30, 1922. Serial No. 532,693.

*To all whom it may concern:*

Be it known that I, CHARLES A. SCHLAFLY, a citizen of the United States, residing at New Philadelphia, in the county of Tuscarawas and State of Ohio, have invented certain new and useful Improvements in Safety Friction Gears, of which the following is a specification.

This invention relates to means for transmitting motion and more particularly to friction gears, and the primary object of the present invention is to provide a novel friction gear which will effectively transmit power up to a predetermined load, and which will slip when the predetermined load is reached, thereby preventing the continuous transmission of motion, which is desirable on numerous different kinds of machinery, especially on coal mining machines, where parts of the machine are liable to break, when undue resistance is offered to the machine.

Other objects of the invention are, first to provide an improved means for effecting frictional contact between the co-operating friction elements of the driving and driven members; second, to provide a novel means which can be quickly adjusted for varying the frictional contact between the contacting elements, so as to effect a locking engagement of said elements with different degrees of pressure, according to the load which the machine will carry without breaking; and third, to provide a novel means for associating the various parts of the gear together, whereby the said gear can be readily and quickly assembled.

A still further object of the invention is to provide an improved means for transmitting motion of the above character, which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 3 is a section through the gear taken on the line 3—3 of Figure 2.

Figure 4 is a fragmentary elevation of one of the friction members showing the springs carried thereby.

Figure 5 is a fragmentary edge elevation of the same.

Referring to the drawings in detail, wherein similar reference characters designate corresponding parts throughout the several views, the letter A indicates a friction gear; and B, a shaft upon which the same can be mounted.

The friction gear A includes a rim C, a hub D, the connection friction device E, and the adjusting means F, which form an important part of the invention and acts as means for varying the degree of pressure between the elements of the friction device E.

Either the rim C or the hub D may be the driving member and in the following specification for the sake of clearness, the hub D will be considered the driving member; and E, the driven member, and the shaft B will be considered as a drive shaft.

Figure 1:
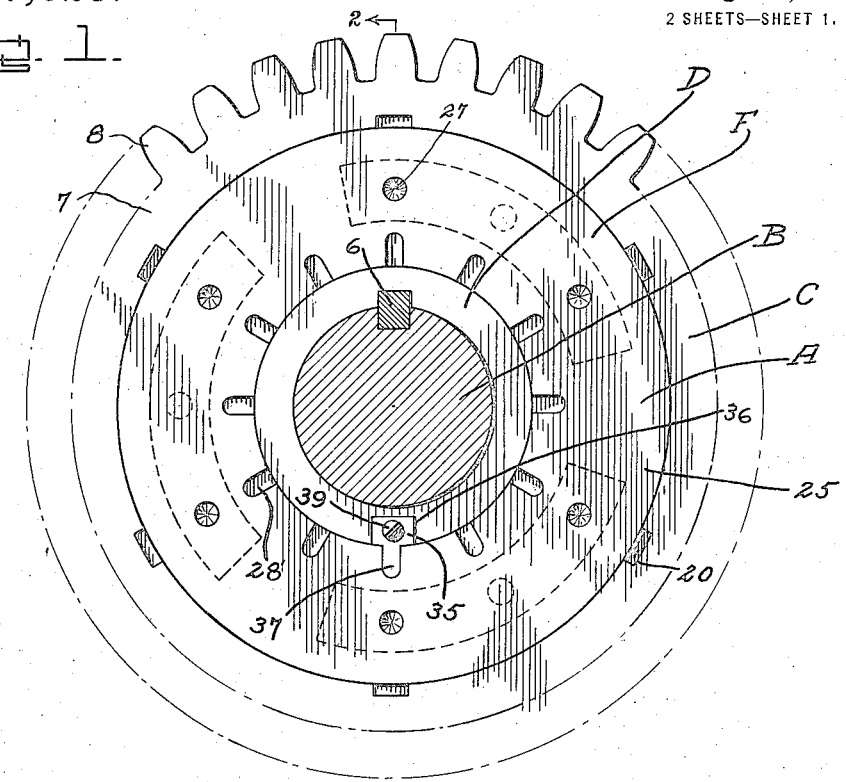
Figure 1 is an elevation of the improved friction gear, showing the same attached to an operating shaft.
Figure 2:
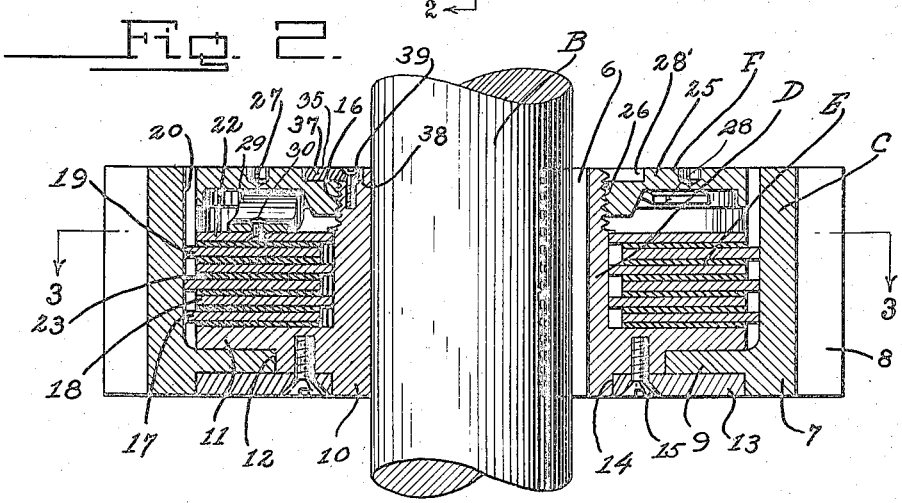
Figure 2 is a diametric section through the gear taken on the line 2—2 of Figure 1.

The hub D is secured to the shaft B in any preferred manner, such as by a key 6, as clearly shown in Figures 1, 2, and 3 of the drawings.

The rim C includes the annular body 7 provided with gear teeth 8, which may be of any preferred character. The inner surface of the rim 7 adjacent to one end thereof is provided with an inwardly extending flange 9, the purpose of which will be hereinafter more fully described.

The hub D includes the body 10, which is fitted directly upon the shaft B, and the outer face of the body 10 adjacent to one end thereof is provided with an outstanding flange 11, the outer face of which may be rabbeted as at 12 for the reception of the flange 9 carried by the annular body 7 of the rim C.

The flange 9 contacting with the flange 11 limits lateral movement of the rim C in one direction in relation to the hub D and a removable retaining ring 13 can be secured in a rabbeted portion 14 of the hub by suitable machine screws or the like 15. As shown, this retaining ring 13 projects outwardly from the body 10 of the hub and engages the face of the flange 9, which is opposite the face engaged by the flange 11 of the hub.

The body 10 of the hub is threaded exteriorly as at 16 for a portion of its length for the reception of a part of the adjusting means F for the friction portion E.

The friction device E for effecting the transmission of motion from the hub D of the rim C includes a set of friction discs or plates 17, and a set of friction discs or plates 18. These sets of discs or plates are disposed in alternate relation and are preferably formed of steel. The set of plates 17 snugly engage the inner face of the body portion 7 of the rim C, and these plates are preferably directly connected thereto by means of radially extending lugs 19 formed on the periphery of the plates, which are adapted to fit in grooves or ways 20 formed on the inner surface of the body portion 7 of the rim. The set of discs or friction plates 18 are adapted to snugly receive the body portion 10 of the hub D, and are preferably positively connected thereto by means of suitable keys or pins 21, which can fit in suitable aligned key-ways formed respectively in the hub D and in the inner edges of said discs or plates 18.

An outer friction plate 22 is provided, which may also be keyed directly to the hub D, and this friction plate 22 forms a part of the adjusting means F as will be hereinafter more fully apparent as the description proceeds. Interposed between the set of plates or discs 17 and 18 and between the innermost disc 17 and the flange 11, and the outermost disc 18 and the disc 22, is interposed friction gripping members 23, which are preferably formed of fiber or the like.

The adjusting means F includes an adjusting ring 25, the inner surface of which is provided with threads 26 for engaging the threaded portion 16 of the hub D. The outer face of the adjusting plate 25 may be provided with suitable openings 27 for the reception of a suitable wrench which will effect the turning of the adjusting plate. The friction disc 22, heretofore mentioned, has secured to the outer face thereof a plurality of resilient elements 28, which have been shown by way of example to be double ended leaf springs 29. These springs 29 are riveted, or otherwise secured as at 30, intermediate their ends, to the friction plate 22, and the terminals of said springs extend outwardly from the friction plate 22, and terminate in feet 31, which are adapted to engage the inner face of the adjusting ring 25.

It is apparent by adjusting the ring 25, the tension of the springs 29 can be regulated, and thereby adjust the pressure contact between the friction plates 17 and 18 and the fiber friction discs 23.

In order to prevent accidental rotation of the adjusting disc 25, a locking lug 35 is provided. This locking lug 35 includes a body 36 and a tongue 37, which is adapted to fit in any one of a plurality of radially extending recesses 28' formed on the outer face of the ring. The body 36 is adapted to fit within a recess portion 38 formed in the hub, and can be secured in position by a suitable machine screw or the like 39.

While I have shown the element C as a portion of a gear and have referred to the device as a friction gear, it is to be understood, of course, that the same may be simply a band and used as a pulley, or the device may be any preferred machine element for transmitting motion.

In operation of the improved invention, the adjusting ring 25 is turned, so as to adjust the tension of the springs 29, so that the friction elements will engage each other at the desired pressure, in order to carry the desired load. When the shaft B is rotated, the hub D will, of course, be rotated therewith, and the friction plates 18 carried thereby will frictionally engage the fiber disc 23, which in turn will engage the friction plates 17 carried by the rim C, and thus the motion will be transmitted to the rim C. When the rim C is subjected to undue resistance, and to a resistance to which the pulley is not adjusted, the friction plates will simply slide one upon the other and thus allow the rim C to slip and thus stop the transmitting of motion to the driven element. This will effectively prevent breakage of any part of the machine in which the friction gear is incorporated.

Changes in details may be made without departing from the spirit or scope of this invention; but, I claim:

1. A power transmitting driving element comprising a hub, a rim, means for preventing lateral movement of the hub and rim in relation to one another, a set of friction plates disposed between the hub and rim and slidably carried by the hub and in driving contact therewith, a second set of plates interposed between the first mentioned plates and arranged between the hub and rim and slidably carried by the rim and in driving contact therewith, fiber gripping discs disposed between the sets of friction plates, an adjusting ring associated with the hub and rim, and springs carried by one of the friction plates and engaging the adjusting ring for urging the friction plates into frictional contact with said frictional gripping discs.

2. A friction pulley comprising a hub, including a sleeve-like body, and an outwardly extending annular flange formed on the body, an annular disposed rim arranged around the hub, an inwardly extending flange formed on the rim engaging the flange on the body portion of the hub, a removable ring secured to the hub for engaging the flange carried by the rim, the body portion of the hub being exteriorly threaded for a portion of its length, sets of friction plates disposed between the body portion of the hub and the rim, one set of the plates being slidably connected with the hub and in driving contact therewith, the other set being slidably carried by the rim and in driving contact therewith, gripping discs disposed between the said friction plates, and an adjusting ring fitted on the body portion of the hub, means for holding the adjusting ring in an adjusted position on the body portion of the hub, and a plurality of springs carried by one of said friction plates, and arranged to engage the inner face of the adjusting ring.

3. A power transmitting driving element comprising a hub, a rim, a set of friction plates slidably carried by the hub and in driving contact therewith, a set of friction plates disposed intermediate the first mentioned sets of friction plates and slidably carried by the rim and in frictional contact therewith, the body portion of the hub being provided with external threads, an adjusting ring threadedly mounted upon the threaded portion of the hub, a plurality of double ended leaf springs secured intermediate their ends to one of the friction plates and slidably engaging the adjusting ring, the adjusting ring having a plurality of recesses formed therein adjacent to the inner edge thereof, and a locking member carried by the hub for engaging in any one of said recesses for holding the adjusting ring in adjusted position against accidental movement.

CHARLES A. SCHLAFLY.